Oct. 10, 1967 J. BAUDE 3,346,797
STATIC RELAY CONTROL CIRCUIT
Filed Jan. 21, 1963
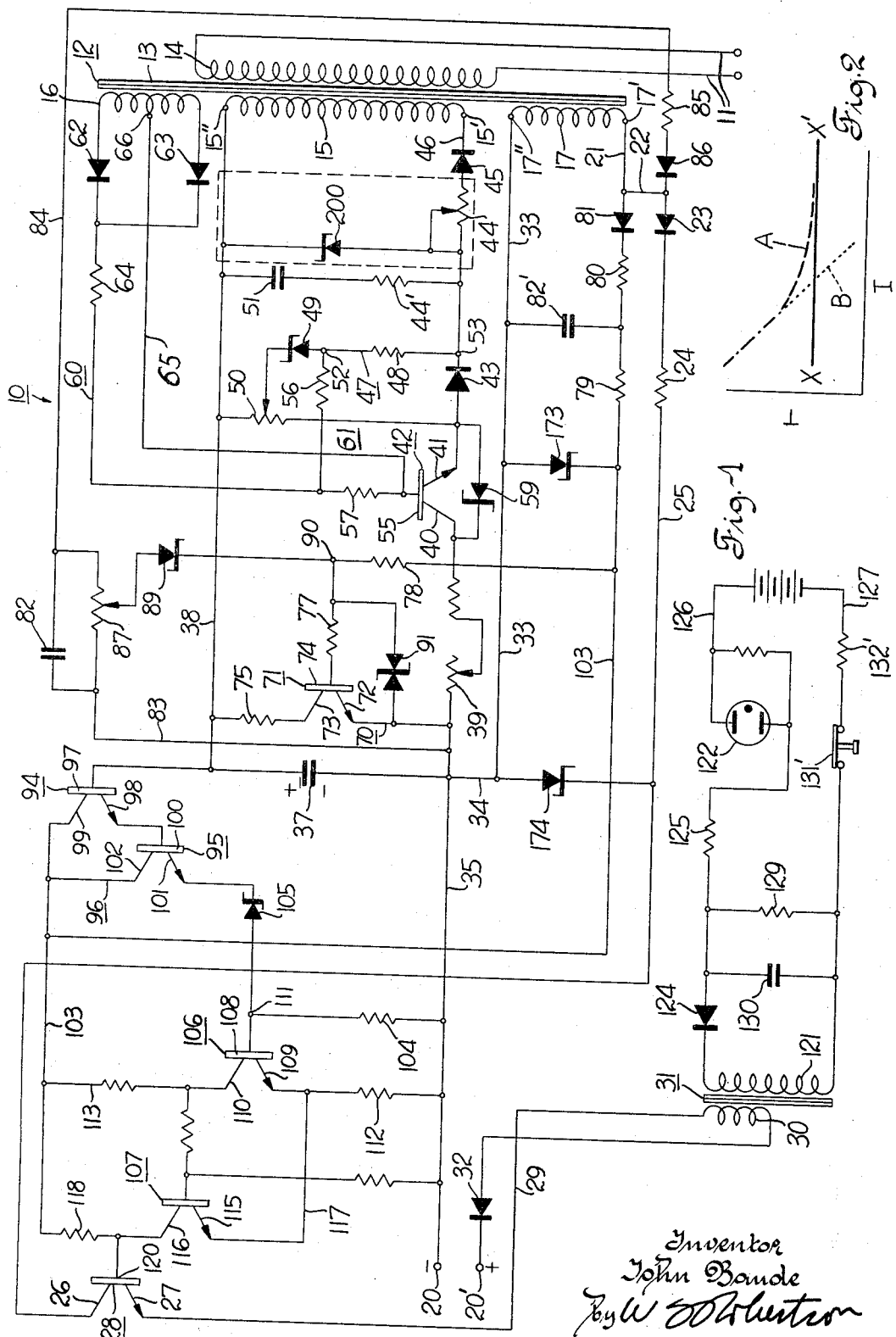

United States Patent Office 3,346,797
Patented Oct. 10, 1967

3,346,797
STATIC RELAY CONTROL CIRCUIT
John Baude, Milwaukee, Wis., assignor to Allis-Chalmers Manufacturing Company, Milwaukee, Wis.
Filed Jan. 21, 1963, Ser. No. 252,633
6 Claims. (Cl. 320—1)

This invention relates to control of protective relay systems, particularly to a new system for controlling the response to the relay to produce a tripping signal at particular time-current levels of current received by the relay.

This invention has particular application to protective relay systems that operate to deenergize a load when a fault occurs in the electrical circuit of the load and its power supply. By applying this invention in a protective relay system, it is possible to obtain response characteristics that are desirable in many applications.

Protective relay systems generally are designed and adjusted to furnish a tripping signal at preselected time-current conditions of overcurrent in a power circuit. A timing circuit having an energy storage device is used in the relay system to produce a tripping signal when the overcurrent is maintained at a certain level for a certain period of time. The higher the overcurrent the shorter is the duration of time necessary to produce the tripping signal. This type of response is often called an inverse time-current function.

The use of a charging circuit or energy storage device alone is adequate in some applications but in many others it is not. When a particular application does not require tripping of a circuit breaker when very short, or transient, high currents appear, the normal protective relay action must be corrected to prevent unnecessary or premature tripping of the circuit breaker.

In accordance with the invention claimed, a new and improved relay control circuit is provided for controlling the time-current function so that the relay will not deenergize the load when a high overcurrent occurs that is shorter than a preselected minimum time.

It is, therefore, one object of this invention to provide a new and improved relay system.

Another object of this invention is to provide a new and improved static relay system enabling a greater variety of inverse time-current response characteristics.

A further object of this invention is to provide a new and improved relay system that does not operate to deenergize a load at overcurrents that appear for a shorter period than a preselected minimum time.

Objects and advantages other than those set forth will be apparent from the following description when read in connection with the accompanying drawing, in which:

FIG. 1 is a diagrammatic view of an improved protective relay system embodying the invention; and FIG. 2 shows the curves of the inverse time-current characteristic of a relay system according to this invention.

It will be apparent that the basic principles of the invention can be applied in various ways to perform the functions described. However, in order to illustrate the invention, a typical embodiment has been shown in FIG. 1 as applied in an embodiment of a static relay system.

Referring to FIG. 1, a protective relay system 10 is utilized for sensing a variable electrical condition such as an overload, in a power source 11. Relay system 10 controls power source 11 through a transformer 12 which is electrically associated therewith. Transformer 12 comprises a core 13, at least one input or primary winding 14 directly connected across the power source 11 and a plurality of secondary windings, for example, windings 15, 16 and 17. If the power source 11 transmits, for example, a series of electrical pulses, then the secondary windings associated with transformer 12 furnish power varying in response to the electrical condition, for example, the amount of current, and will transmit to the relay system 10 a plurality of signal pulses. The duration, amplitude and frequency of the signal pulses depend upon the saturation condition of core 13 and the condition of the primary power source.

Secondary windings 15, 16 and 17 of transformer 12 are connected to inverse time-voltage or inverse time-current circuits of the relay and employ transistor controlled pulse responsive electrical circuit elements with integrating inverse time-voltage or current characteristics.

A system is provided for the control and production of a signal applied to the output terminals 20, 20'. This applied signal to terminals 20, 20' is the output signal of secondary winding 17 of transformer 12 fed from terminal 17' of winding 17 through conductor 21, conductor 22, diode 23, resistor 24, conductor 25, collector 26 and emitter 27 of the normally nonconductive transistor 28, conductor 29, primary winding 30 of transformer 31, diode 32 to terminal 20', and from terminal 17" of winding 17 through conductors 33, 34 and 35 to terminal 20.

Transistor 28 controlling the applied signal pulse to terminals 20, 20' is in turn controlled by the integrated effects of the electrical energy such as, for example, pulses received from secondary windings 15, 16 and 17 of transformer 12.

The output signals of secondary windings 15, 16 and 17 are used to control the energization of transistor 28. Electrical energy emitted by winding 15 charges capacitor 51 and above a certain predetermined energy level also charges an energy storage device, such as capacitor 37. Capacitor 37 may be directly connected to terminal 15" of secondary winding 15 through a conductor 38 and to terminal 15' of secondary winding 15 through an adjustable resistor 39.

The circuit in this form, namely, where capacitor 37 is directly connected to winding 15 through conductor 38 and adjustable resistor 39, has a fixed time constant which is independent of the electrical condition of the source. The time constant can be varied depending upon the selected resistance values of the adjustable resistor 39 and capacitors 51 and 37. A means is provided for passing electrical enrgy to capacitor 37 only when the electrical energy exceeds a preselected amount, i.e., when above a preselected level. This means may comprise a semiconductor switch such as, for example, a transistor 42. Control circuits are connected in series with resistor 39 in the manner shown.

Only one normally nonconducting semiconductor such as transistor 42 comprising a collector 40 and a base 55 is used. Collector 40 and emitter 41 are connected in series with a diode 43, resistor 44, diode 45, and conductor 46 to terminal 15' of winding 15 and through resistor 39 to one side of capacitor 37. Upon capacitor 37 receiving a predetermined electrical charge, a complex mono-bistable electrical or electromechanical or electromagnetic or electrochemical device is triggered into a state of conduction which renders transistor 28 conductive to pass energy such as pulses from secondary winding 17 of transformer 12 to terminals 20, 20'. The absorbed energy in capacitor 37 provides the required inverse time energy functions before triggering action is accomplished.

Transistor 42 is normally biased to cut off, but is rendered conductive upon the pulses transmitted from secondary winding 15 reaching a predetermined level. The predetermined level is established as the full load operating point of the relay. Transformer 12 transmits electrical energy up to a predetermined level without charging capacitor 37 because transistor 42 is retained biased in its nonconductive state. In order to determine the point of conduction of transistor 42, a shunting or sensing device or circuit 47 is arranged across the secondary winding 15 of transformer 12 and comprises a resistor 48, a zener diode 49 and a potentiometer 50. Shunting capacitor 51 is shown across secondary winding 15 and in series with resistor 44, and diode 45 for stabilizing purposes. Capacitor 51 is optional and may be eliminated for ultra-fast operating relays or may be connected in series with a suitable resistor 44', as shown. Diode 45 and resistor 44 connected in series with secondary winding 15 charge capacitor 51 on each electrical pulse of proper polarity applied to primary winding 14 of transformer 12. Zener diode 49 starts to break down at the instant the voltage across it reaches a predetermined value at which time it starts to pass current. When zener diode 49 passes current, a voltage will appear across resistors 48 which renders point 52 in circuit 47 positive with respect to point 53.

Point 52 is interconnected with a base 55 of transistor 42 through resistors 56 and 57. Making point 52 positive with respect to a point 53 puts or impresses a positive potential on base 55 of transistor 42 and renders it conductive. When zener diode 49 is nonconductive, only transistor leakage current flows through circuit 47 and the base 55 of transistor 42 is biased negative with respect to emitter 41 rendering transistor 42 nonconductive. In the nonconductive state of zener diode 49, only the voltage drop of approximately .6 volt appears across diode 43. When zener diode 49 conducts current, transistor 42 is rendered conductive and passes current through its emitter collector circuit to capacitor 37. The potential applied to base 55 of transistor 42 upon the conduction of zener diode 49 is known as bias. This bias is a differential potential between the potential drop built up across resistor 48 upon the conduction of zener diode 49 and the .6 volt drop across the diode 43. In order to limit the possible voltage drop across transistor 42 at cutoff to a predetermined value a zener diode 59 is applied in shunting arrangement across its emitter and collector elements.

In order to restrict the amount of energy transferred to capacitor 37, a restraining signal in addition to the DC bias is applied to base 55 of transistor 42 from secondary winding 16 of transformer 12 through circuits 60 and 61. Circuit 60 comprises a pair of diodes 62 and 63 connected at one point to each other and each of different terminal ends of secondary winding 16 and at said one point further connected in series with a pair of serially connected fixed or variable resistors 64 and 57. Circuit 61 comprises a conductor 65 connected at one end to the base 55 of transistor 42 and at the other end to the center tap 66 of secondary winding 16 of transformer 12. The voltage pulses from winding 16 are applied across resistor 57 and in combination with the signal from zener diode 49 render transistor 42 periodically conductive. Rendering transistor 42 conductive causes the emitter collector circuit of transistor 42 to conduct current. The restraining signal from winding 16 of transformer 12 renders transistor 42 conductive for only a part of a cycle so that the time duration of curernt conduction, for example, the width and amplitude of the current cycle passed by transistor 42 may be controlled. By varying the position of potentiometer 50 and resistance of resistor 64 the inverse time current characteristics of the relay may be varied.

The emitter and collector of transistor 42 are connected in series with the winding 15 of transformer 12, and when transistor 42 is biased for cutoff, no charge is placed on capacitor 37. Because transistor 42 might pass a slight amount of current at high temperatures due to leakage current causing a charge to build up on capacitor 37 and eventually tripping the flip-flop circuits controlling transistor 28, another sensing circuit such as short circuit 70 is provided across capacitor 37. Short circuit 70 comprises a transistor 71 having an emitter 72, collector 73 and base 74. The emitter 72 and collector 73 are connected in series with a resistor 75 in shunt connection across capacitor 37, as shown. Transistor 71 is purposely kept conductive with the circuitry connected to its base 74 when transistor 42 is rendered nonconductive. Transistor 71 is rendered conductive upon a capacitor 82' being charged and by being connected to terminal 17' of winding 17 of transformer 12 through resistors 77, 78, 79, 80 and diode 81. Transistor 71 is rendered nonconductive upon a capacitor 82 being charged to a predetermined value. Capacitor 82 is connected through conductors 83, 34, and 33, to terminal 17'' of secondary winding 17 of transformer 12 and through a conductor 84, resistor 85, diode 86 and conductors 22 and 21 to terminal 17' of secondary winding 17 of transformer 12.

A potentiometer 87 is connected in shunting arrangement across capacitor 82 with one terminal thereof connected through a zener diode 89 to a point 90 between the series connection of resistors 77 and 78. When the potential across capacitor 82 reaches a predetermined value, zener diode 89 breaks down and starts to conduct current. When zener diode 89 starts to conduct, the potential on base 74 of transistor 71 is changed from positive to negative with respect to its emitter 72 and the transistor 71 ceases to pass current through its emitter collector circuit. When transistor 71 becomes nonconductive, the shunt circuit across capacitor 37 comprising the emitter collector circuit of transistor 71 is interrupted. A charge then builds up across capacitor 37 upon the conduction of the emitter collector circuit of transistor 42. A double anode zener diode 91 is connected in shunting arrangement across the emitter 72 and base 74 of transistor 71 and resistor 77 to protect the transistor against abnormally high voltage pulses which would destroy it.

As noted from the above, the controls of transistors 42 and 71 require coordination to start charging capacitor 37 when a predetermined voltage level has been reached by secondary winding 15. Thus, transistor 71 may be intermittently rendered nonconductive substantially simultaneously at the time transistor 42 is rendered conductive. When the voltage level of the electrical energy transmitted by secondary winding 15 is reduced to a predetermined value below the breakdown level of zener diode 49, shunting circuit 47 is deenergized and no longer conducts current and the potential on base 55 of transistor 42 is made less positive or rendered negative causing transistor 42 to become nonconductive. When transistor 42 becomes nonconductive, transistor 71 is rendered conductive. Transistor 71 is intermittently rendered conductive by the voltage of the pulses from secondary winding 17 being reduced proportionally with the reduction of the voltage level of pulses from secondary winding 15 causing zener diode 89 to be rendered nonconductive. The lack of current flow through zener diode 89 causes the potential applied to base 74 of transistor 71 to become more positive and transistor 71 to become conductive. As soon as transistor 71 becomes conductive, capacitor 37 is discharged. Capacitor 37 may be charged and discharged practically instantaneously.

Although capacitor 37 is disclosed as the electric pulse accumulator or energy storage device for storing the time voltage characteristics of a series of pulses, i.e., charged at a rate depending on the volt second characteristics of the pulses passed by the sensing circuit 47, other types of storage devices may be used. For example, a square loop magnetic core may be used which is energized in steps until it is saturated and will pass current. An inductance or a time relay device also may be used for a storage device. This invention is directed not merely to the use of a capacitor as a storage device, but among other things, to the method of charging the capacitor and its control by and with other static devices.

In order to increase the input impedance to the static flip-flop circuit controlling transistor switch 28 to refrain from unduly reducing the charge on capacitor 37, a pair of transistors 94 and 95 are used in a sensing circuit 96 provided for either continuously or sequentially checking the charge on this storage capacitor. The sensing circuit is continuously sampling the charge on capacitor 37. Transistor 94 comprises a base 97, emitter 98 and collector 99. Transistor 95 comprises a base 100, emitter 101 and collector 102. Base 97 of transistor 94 is connected to the positive terminal of capacitor 37 and the emitter 98 is connected to the base 100 of transistor 95. The collectors 99 and 102 of transistors 94 and 95, respectively, are connected through conductor 103, resistors 79 and 80, diode 81 and conductor 21 to terminal 17' of secondary winding 17 of transformer 12.

When capacitor 37 is charged to a predetermined voltage, the positive charge is placed on base 97 of transistor 94. The emitter 98 of transistor 94 and the emitter 101 of transistor 95 assume essentially a potential slightly more positive than that of conductor 35 when capacitor 37 is in the state of discharge because of the leakage current flowing from wire 103 through collector 99 and emitter 98 of transistors 94 and collector 102 and emitter 101 of transistor 95, through zener diode 105 and resistor 104 to conductor 35. The voltage which appears between conductors 35 and 103 is limited by zener diode 173.

Transistors 94 and 95 are connected in a type of connection known as "compound-emitter-follower." The emitter potential will be slightly more negative than the base potentials of the respective transistors 94 and 95. Thus, if voltages rising on the capacitor 37 exceed the breakdown voltage of the zener diode 105, emitters 101 and 98 are held at a potential determined by the voltage drop across resistor 104 and zener diode 105. As the charge on the capacitor 37 continues to rise, bases 100 and 97 of transistors 95 and 94 will become more positive than the respective emitters 101 and 98 and current will now flow from terminal 17' of winding 17 through conductor 21, diode 81, resistor 80, resistor 79, conductor 103, collector 99 and emitter 98 and collector 102 and emitter 101 of transistors 95 and 94, respectively, and through zener diode 105, resistor 104, conductors 35, 34 and 33 to terminal 17'' of winding 17.

Under this operating condition, base current of transistors 94 and 95 is flowing from terminal 15'' of winding 15 through conductor 38, base 97 and emitter 98 of transistor 94, base 100 and emitter 101 of transistor 95, zener diode 105, resistor 104, conductor 35, resistor 39, collector 40, emitter 41 of transistor 42, diode 43, resistor 44, diode 45, conductor 46 and terminal 15' of winding 15. During the period of conduction, the charge on capacitor 37 will contribute considerably to the base curent flow.

The secondary winding 121 of transformer 31 is connected across a diode 124 in series with a capacitor 130. The electrical pulses which are emitted by winding 121 when transistor 28 passes intermittently current through winding 130 are stored in capacitor 130. This voltage is added to the voltage existing between conductors 126 and 127 and triggers the neon light 122 into conduction. Current then flows from conductor 127 through resistor 132', normally closed push button 131', resistor 129 and resistor 125 to conductor 126 until push button 131 is operated interrupting the current flow causing the neon light to extinguish itself.

The conduction of transistor 95 through its emitter collector circuit actuates the switch or flip-flop circuit comprising transistors 106 and 107. Transistor 106 comprises a base 108, emitter 109 and a collector 110. Base 108 is connected at point 111 between resistor 104 and diode 105 in series circuit between conductors 103 and 35 in the emitter collector circuit of transistor 95. The flow of current through the latter circuit including the emitter and collector of transistor 94 applies a positive potential with reference to emitter 109 to base 108 of transistor 106 and renders it conductive. Current then flows from conductor 103 through conductor 113, collector 110, emitter 109 of transistor 106 and resistor 112 to conductor 35.

In the usual manner for flip-flop circuits of the type shown in the circuits for transistors 106 and 107 upon the flow of current through the emitter collector circuit of transistor 106, the base of transistor 107 is rendered negative with respect to its emitter 115 and current flows from conductor 103 (considered positive in polarity) through resistor 118, collector 116, emitter 115, conductor 117, resistor 112 to conductor 35 (considered negative in polarity.) The discontinued flow of current through the emitter collector circuit of transistor 107 renders the base 120 of transistor 28 positive thereby rendering transistor 28 conductive. Transistor 28 then passes half wave AC current pulses from winding 17 through conductors 21, 22, diode 23, resistor 24, conductor 25, collector 26, emitter 27, conductor 29, primary winding 30 of transformer 31, diode 32 to the positive terminal 20' of the relay output signal terminals 20, 20'. The amplitude of the half wave signal passed by transistor 28 is limited by zener diode 174.

Pulses either constant or variable are fed into transformer 12. Secondary windings 15, 16 and 17 responsive to those pulses energize their respective circuits. Pulses or parts thereof from secondary winding 15 above a given voltage value are fed to storage capacitor 37. Transistor 42 provides a switching function in the circuit utilized to charge capacitor 37 from secondary winding 15. Transistor 42 operating as a switching device becomes coductive upon the transmission by secondary winding 15 of pulses above a predetermined voltage rating. When pulses of a predetermined voltage rating are transmitted by secondary winding 15, zener diode 49 in the shunting circuit 47 breaks down and conducts current. The conduction of current by shunting circuit 47 biases transistor 42 in the conductive direction. The bias potential applied to base 55 of transistor 42 is the resultant effect of three different and variable voltage values or signals as heretofore explained. Secondary winding 16 provides biasing, fully rectified pulses which, in combination with the biasing effect of diode 43, limits the portions of or pulses passed by transistor 42 when rendered conductive. Transistor 42, when conductive, passes discrete amounts of electric energy such as portions of parts or all of the pulses emitted by secondary winding 15 to storage capacitor 37.

Storage capacitor 37, upon reaching a predetermined charge, triggers the sensing circuit comprising the interconnected transistors 94 and 95. Upon energization of transistors 94 and 95, the flip-flop circuit comprising transistors 106 and 107 is energized thereby rendering transistor 28 conductive. Upon the conduction of transistor 28, pulses are passed from a secondary winding 17 through transistor 28 and the annunciation device comprising transformer 31 to the output terminals 20, 20'. The annunciation device is triggered upon the energization of transformer 31 to illuminate the neon lamp 122 or provide an audible sound by means of suitable devices.

FIG. 2 shows an example of a curve that would result from the operation of the relay. The plot is made on log-log paper and shows by the dotted line B that the tripping of a circuit breaker will occur when combined time (T) and current (I) reach the curve level.

As previously mentioned, it is often desirable to have a time-current characteristic that is similar to the dashed line. It is seen that with this characteristic no tripping will occur if the period of time that a particular current is received is less than the asymptote x–x' to the dashed line A.

In accordance with this invention, an energy limiting means is utilized to limit the quantity of energy passed to an energy storing device, such as capacitor 37. This energy limiting means may comprise a nonlinear energy absorbing device, such as a zener diode 200, connected to the electrical energy source. This limiting means is active above a certain point, determined by the breakdown voltage of zener diode 200, such that energy exceeding this breakdown level is not introduced to capacitor 37 but is shunted out.

The level of electrical energy that will be shunted past capacitor 37 may be predetermined by selection of the zener diode or by a means for adjusting the comparative resistances to vary the amount of electrical energy that is bypassed. This means may comprise a potentiometer 44 which can be adjusted to vary the division of electrical current between the zener diode and capacitor 37.

Although but a few embodiments of the present invention have been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A control system responsive to current in an electrical circuit to produce a signal, said control system comprising: means responsive to the current in the electrical circuit for producing an output varying as a function of the current in the electrical circuit; storage means connected to receive the output for storing energy received from the output; means connected to the storage means for controlling the portion of the output received by the storage means; means for producing the signal at a predetermined level of energy stored by the storage means; limiting means responsive to the level of the output for passing to the storage means only that portion of the output below a predetermined level; means for short circuiting said storage means; and means for making said short circuiting means inoperative when the output exceeds a predetermined minimum level.

2. A control system responsive to current in an electrical circuit to produce a signal, said control system comprising: means responsive to the current in the electrical circuit for producing an output varying as a function of the current in the electrical circuit; storage means connected to receive the output for storing energy from the output as a potential; means for controlling the portion of the output received by the storage means; means for producing the signal at a preselected level of energy stored by the storage means; a zener diode connected across the storage means for passing to the storage means only that portion of the output below a preselected maximum level; and means connected to the storage means for short circuiting the storage means when the output is below a preselected minimum level.

3. A control system responsive to current in an electrical circuit to produce a signal, said control system comprising: means responsive to the current in the electrical circuit for producing an output varying as a function of the current in the electrical circuit; a capacitor connected to receive the output; means for controlling the portion of the output received by the capacitor; means for producing the signal at a predetermined level of energy stored by the capacitor; limiting means responsive to the level of the output connected to receive the output and connected to the capacitor for passing to the capacitor only that portion of the output below a predetermined maximum level; and means connected to the capacitor for short circuiting the capacitor when the output is below a predetermined minimum level.

4. A control system responsive to current in an electrical circuit to produce a signal, said control system comprising: means responsive to the current in the electrical circuit for producing an output varying as a function of the current in the electrical circuit; a capacitor connected to receive the output; means connected to the capacitor for controlling the portion of the output received by the capacitor; a sensing device connected to the capacitor for producing a signal when the voltage across the capacitor reaches a preselected level; a zener diode connected across the capacitor for passing to the capacitor only that portion of the output below a preselected maximum level; and means connected to the capacitor for short circuiting the capacitor when the output is below a preselected minimum level.

5. A control system responsive to current in an electrical circuit to produce a signal, said control system comprising: means responsive to the current in the electrical circuit for producing an output varying as a function of the current in the electrical circuit; storage means connected to receive the output for storing energy from the output as a voltage; means connected to the storage means for controlling the portion of the output received by the storage means; limiting means responsive to the level of the output connected to receive the output and connected to the storage means for passing to the storage means only that portion of the output below a predetermined maximum level; means connected to the storage means for preventing the storing of energy by the storage means when the output is below a predetermined minimum level; and a zener diode connected in parallel with the storage means to be rendered conductive when the voltage across the storage means reaches a predetermined level.

6. A control system responsive to current in an electrical circuit to produce a signal, said control system comprising: means responsive to the current in the electrical circuit for producing an output varying as a function of the current in the electrical circuit; storage means connected to receive the output for storing energy received from the output; means connected to the storage means for controlling the portion of the output received by the storage means; means for producing the signal at a predetermined level of energy stored by the storage means responsive to the level of the output; limiting means for passing to the storage means only that portion of the output below a predetermined maximum level; and a transistor connected to receive a function of the output and having its emitter-collector circuit in parallel with the storage means, said transistor biased and controlled to remain in a conductive state when the output is below a predetermined minimum level and to assume a nonconductive state when the output is above said predetermined minimum level.

References Cited

UNITED STATES PATENTS

| 2,789,254 | 4/1957 | Bodle et al. | 307—88.5 |
| 2,875,382 | 2/1959 | Sandin et al. | 317—33 X |
| 3,155,879 | 11/1964 | Casey et al. | 317—33 |
| 3,214,641 | 10/1965 | Sonnemann | 317—33 X |

BERNARD KONICK, *Primary Examiner.*

E. LIEBERSTEIN, J. BREIMAYER,
*Assistant Examiners.*